Nov. 22, 1960   E. J. KEYSER   2,960,889
GYROSCOPICALLY CONTROLLED TRANSMISSION
Filed Dec. 11, 1959   5 Sheets-Sheet 3

INVENTOR.
EDWIN J. KEYSER
BY Woodling & Krost
Attys.

Nov. 22, 1960 E. J. KEYSER 2,960,889
GYROSCOPICALLY CONTROLLED TRANSMISSION
Filed Dec. 11, 1959 5 Sheets-Sheet 5

INVENTOR.
EDWIN J. KEYSER
BY Woodling + Kost
ATTORNEYS

United States Patent Office 2,960,889
Patented Nov. 22, 1960

2,960,889
GYROSCOPICALLY CONTROLLED TRANSMISSION

Edwin J. Keyser, 6 Valley Drive, Billings, Mont.

Filed Dec. 11, 1959, Ser. No. 859,071

10 Claims. (Cl. 74—751)

The invention in general relates to a transmission and more particularly to a variable speed transmission for variably controlling the relative speed between a drive shaft and a driven shaft.

An object of the invention is the provision of a transmission having gyroscopic means to control the relative speed between a drive shaft and a driven shaft.

Another object of the invention is the provision of a transmission having gyroscopic means to control the relative speed between a drive shaft and a driven shaft in which the gyroscopic means is driven by the drive shaft.

Another object of the invention is the provision of adjusting the gyroscopic means to adjustably vary the relative speed between the drive shaft and the driven shaft.

Other objects and a fuller understanding of the invention may be had by referring to the following description and claims, taken in conjunction with the accompanying drawings, in which:

Figure 1:
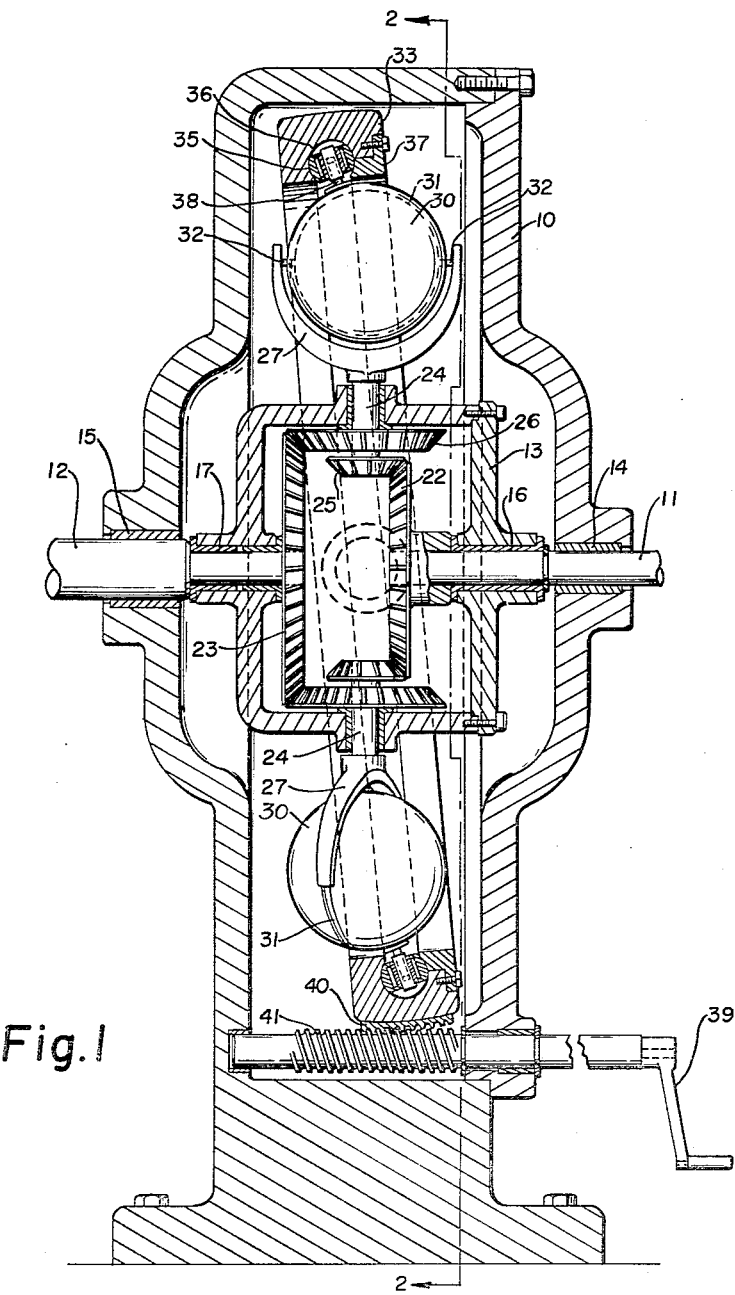
Figure 1 is a vertical cross-sectional view of a device embodying the invention.
Figure 2:
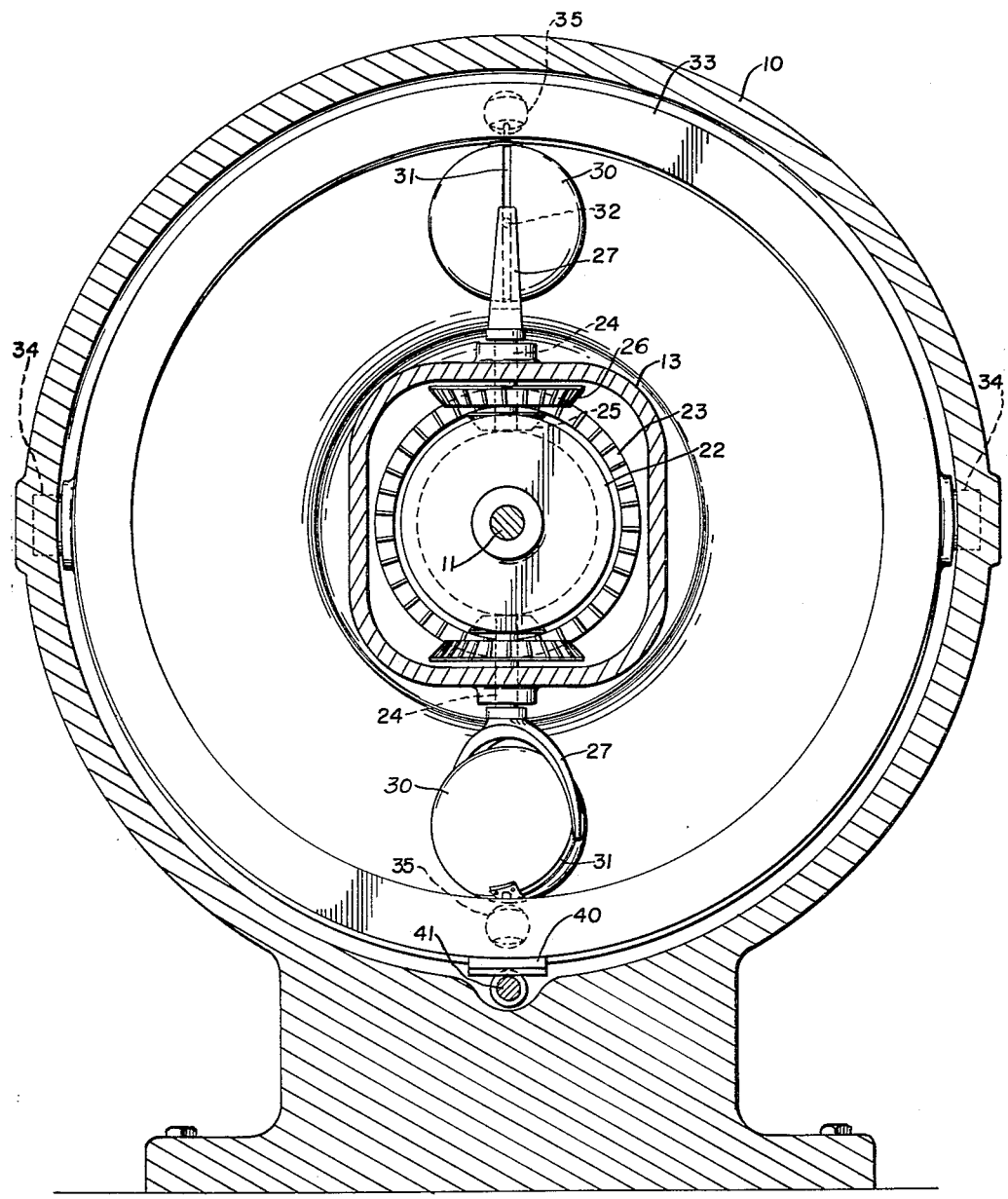
Figure 2 is a cross-sectional view of the device shown in Figure 1 taken along the line 2—2 thereof.

With reference to Figures 1 and 2 of the drawing, the invention comprises a housing 10 having a drive shaft 11 and a driven shaft 12. The two shafts are substantially in axial alignment with each other. The drive shaft 11 is rotatively mounted in the housing by means of a bearing 14 and the driven shaft 12 is rotatively mounted in the housing by means of a bearing 15. A torque reaction cage 13 is mounted in the housing and is rotatively journaled on the drive shaft 11 and the driven shaft 12 by means of bearings 16 and 17, respectively. A drive gear 22 is mounted in the torque reaction cage 13 and is fastened to the end of the drive shaft 11. A driven gear 23 is mounted in the torque reaction cage 13 and is fastened to the end of the drive shaft 12. A plurality of radially mounted, auxiliary shafts 24 are journaled in the torque reaction cage 13 and have an outer end externally of the cage and an inner end portion internally of the cage. In the drawings, two auxiliary shafts 24 are illustrated but it is to be understood that any number of auxiliary shafts may be employed. Respectively mounted on the inner end of the shafts 24 is a first auxiliary gear 25 which meshes with the drive gear 22. Also, respectively mounted on the inner end of the auxiliary drive shaft 24 is a second auxiliary gear 26. The first and second auxiliary gears interconnect the drive and driven shafts 11 and 12.

Respectively mounted on the outer portion of the auxiliary shafts 24 is a gyroscopic yoke 27. The gyroscopic yoke 27 has an axis of rotation axially in alignment with the auxiliary shaft. Rotation of the torque reaction cage 13 about the drive and driven shafts 11 and 12 rotates the yokes 27 with the axis of rotation of the yoke moving through an annular reference path which is a vertical plane perpendicular to the axes of the shafts 11 and 12. A gyroscopic mass 30 is mounted in the gyroscopic yoke 27. As illustrated, the gyroscopic mass 30 has a circumferential groove 31 into which fits pivot pins 32. The circumferential groove 31 and the pivot pins 32 constitute a universal connection for rotating the gyroscopic mass 30 about an axis tiltable with respect to the axis of rotation of the yoke. An annular cam member 33 is mounted around the outside of the gyroscopic mass 30 and is journaled in the housing 10 by means of trunnions 34; see Figure 2. Inside the annular cam member 33 is an annular track 36 having substantially a circular cross section. Mounted in the annular track 36 is a cam rider 35 comprising bearing means having a spherical outer member which runs in the annular track 36. The cam rider 35 is held in the annular track by means of a flange 37. A telescopic shaft 38 extends from the gyroscopic mass 30 to the inside of the cam rider 35. The telescopic shaft 38 and the cam rider 35 is connected to the gyroscopic mass 30 in axial alignment with the axis of rotation of the gyroscopic mass. The action of the cam rider 35 fitting in the annular track 36 is such that the cam rider 35 resists tilting of the gyroscopic mass in any direction of the annular reference path or plane which permits tilting of the gyroscopic mass only in a plane of the drawing of Figure 1. The annular cam member 33 may be tilted about its trunnions 34 by means of a crank 39 which operates rack and pinion means 40 and 41. When the annular cam member 33 is operated by the crank so that it assumes a vertical position, then the cam rider means is in a neutral alignment position, in which case the axis of rotation of the gyroscopic mass 30 is in alignment with the annular reference path. In this condition, no torque is transmitted from the drive shaft 11 to the driven shaft 12 because the torque reaction cage 13 may freely rotate. When the crank 39 is rotated to move the annular cam member 33 out of said neutral alignment position to the tilted position shown in Figure 1 of the drawing, the axis of rotation of the gyroscopic mass is at a tiltable angle with respect to the annular reference path. Rotation of the gyroscopic mass at the tiltable angle by the drive shaft 11 forces the cam rider 35 against the annular track 36 of the annular cam member 33 and produces a component force on the gyroscopic yoke 27 in any direction of the annular reference path. This component force tends to resist rotation of the torque reaction cage 13 about the drive and driven shafts so that troque is transmitted from the drive shaft 11 to the driven shaft 12 to control the relative speed between the drive and driven shafts.

Figure 3:
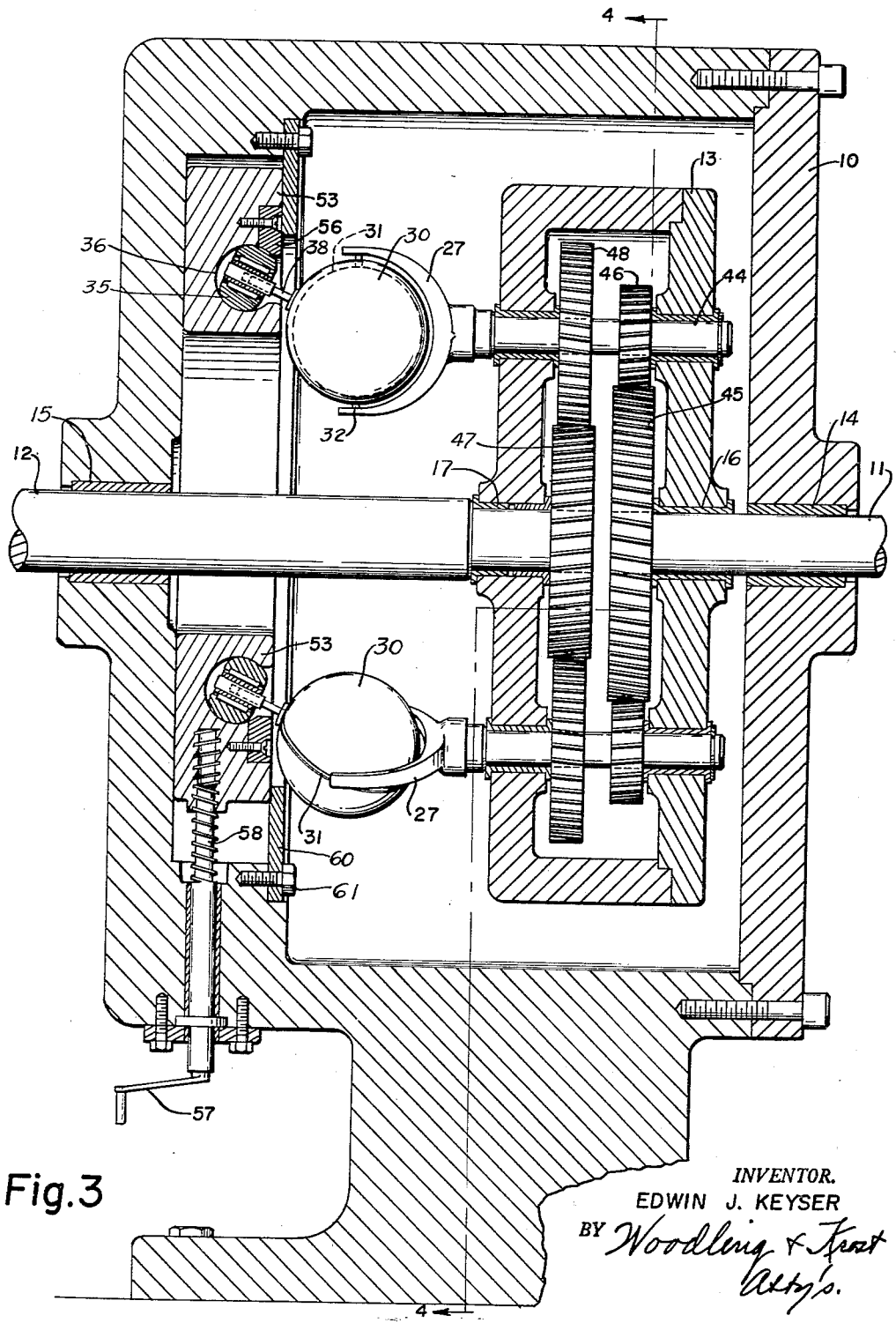
Figure 3 is a vertical cross-sectional view of a modified device embodying the features of the invention.
Figure 4:
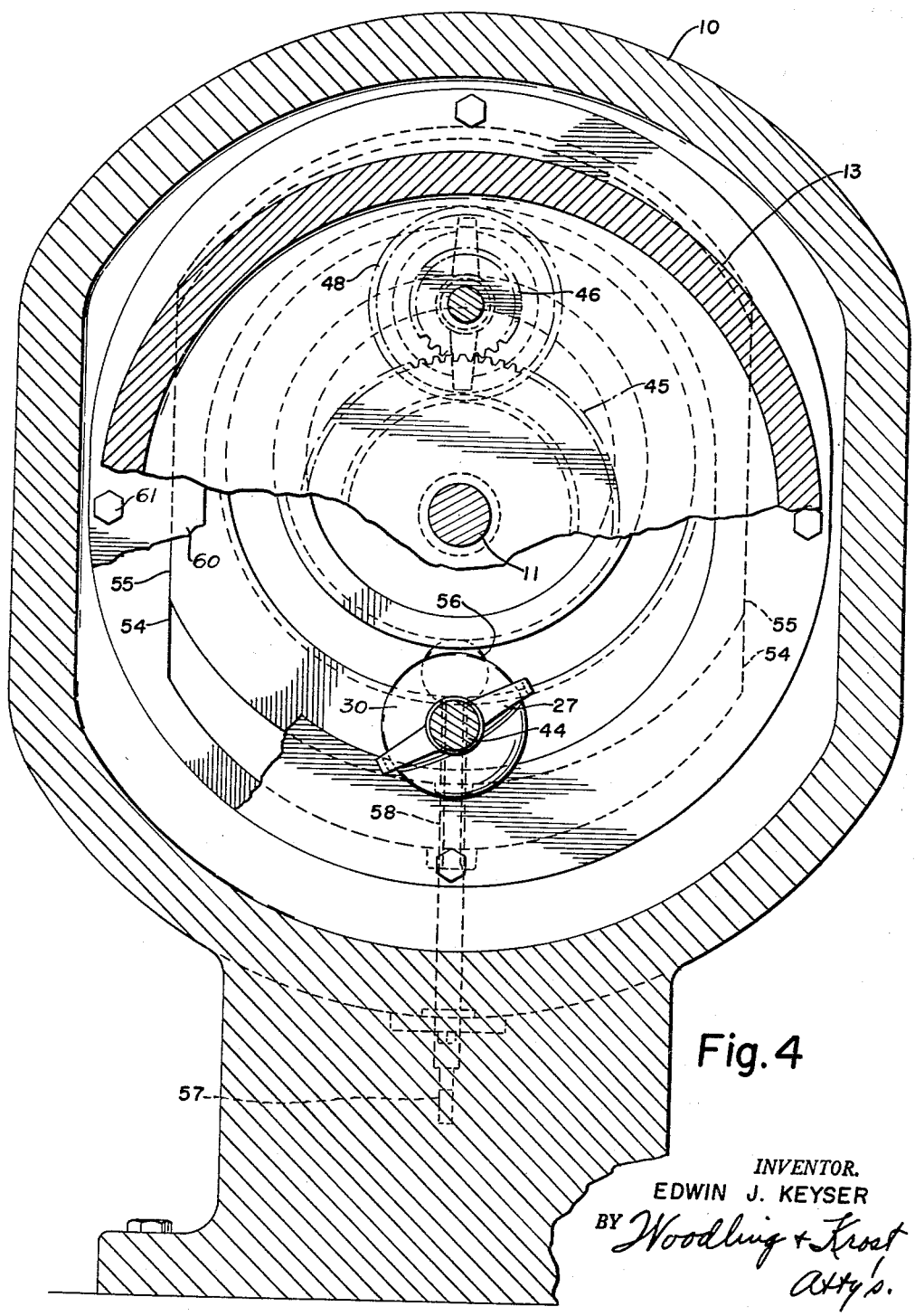
Figure 4 is a cross-sectional view taken along the line 4—4 of Figure 3.

The invention shown in Figures 3 and 4 is a modification of the invention shown in Figures 1 and 2, in that rotation of the torque reaction cage 13 rotates the yoke with the axis of rotation of the yoke moving through an annular reference cylinder having an axis substantially parallel to the axes of the drive and driven shafts 11 and 12. Corresponding parts are identified by corresponding reference numbers. Instead of having radially extending auxiliary shafts are previously described, the Figures 3 and 4 have parallel auxiliary shafts 44 which have axes substantially parallel to the axes of the drive and driven shafts. A gear 45 mounted on the end of the drive shaft 11 meshes with a gear 46 mounted respectively on the auxiliary shafts 44. A gear 47 mounted on the driven shaft 12 meshes with a gear 48 mounted respectively on the auxiliary shafts 44. Instead of having an annular cam member mounted on trunnions, the device shown in Figures 3 and 4 is provided with a slidable cam member 53 which is slidably mounted in the housing. The sides of the cam member 53 are straight and are identified by the reference character 54 which slide up-and-down in straight side bosses 55. The annular cam member 53 is held in place by an annular plate 60 fastened to the housing by screws 61. The cam rider and the gyroscopic mass is the same construction as shown in Figures 1 and 2. The cam rider may be held in the annular cam member 53 by means of a flange 56.

As illustrated in Figures 3 and 4, the annular cam member 53 may be moved up-and-down by means of a crank 57 which operates a screw 58 that threadably engages the cam member 53. When the annular cam member 53 is in a concentric alignment with the direction of the annular reference cylinder, the axis of rotation of the gyroscopic mass is in neutral position, then there is no tendency to resist rotation of the torque reaction cage and thus operation of the device under this condition does not transmit any torque from the drive shaft to the driven shaft. When the crank is operated to move the annular cam member 53 upwardly or in an eccentric position as shown in Figure 3, the gyroscopic mass is tilted with respect to the axis of rotation of the yoke. Rotation of the gyroscopic mass in its tilted position forces the cam rider against the annular track within the annular cam member and produces a force on the gyroscopic yoke in a direction of the annular reference cylinder and thereby tends to resist rotation of the torque reaction cage about the drive and driven shaft so that torque is transmitted from the drive shaft to the driven shaft to control the relative speed between the drive and driven shafts.

Figure 5:
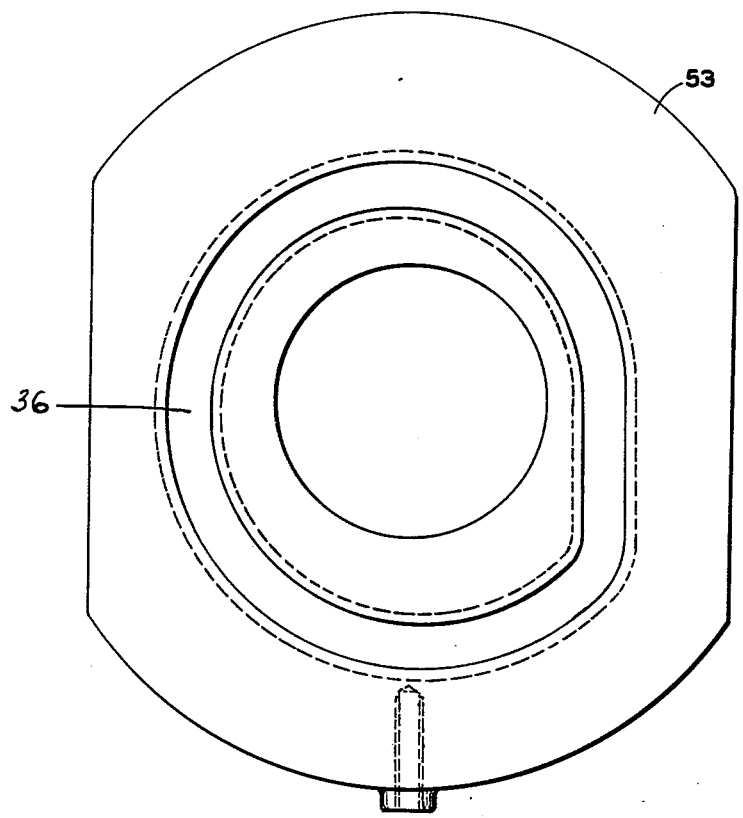
Figure 5 is a view of a cam, usable in the device shown in Figures 3 and 4.

For purposes of this disclosure, let it be noted that there are an infinite number of operable cams which might be used on either the device shown in Figures 1 and 2, or the device shown in Figures 3 and 4, as per example of Figure 5, and it should therefore be clearly understood that in every case where the word annular is used to describe a cam surface or path, this in no way limits the surface or path to a circle. The cam shown in Figure 5 has been indicated by the reference numeral 53 and has no more reference numerals applied thereto. This cam can be used to directly replace the cam 53 which is shown in Figures 3 and 4.

This application is a continuation-in-part of my application, Serial No. 621,060, filed November 8, 1956, for Gyroscopically Controlled Transmission, and now abandoned.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A variable speed transmission comprising a housing, a drive shaft journaled in the housing, a driven shaft journaled in the housing, said shafts being substantially in axial alignment with each other, a torque reaction cage in said housing rotatively mounted on said shaft, a drive gear in said torque reaction cage and mounted on said drive shaft, a driven gear in said torque reaction cage and mounted on said driven shaft, an auxiliary shaft journaled in said torque reaction cage and having an outer portion externally of the cage and an inner portion internally of the cage, auxiliary gear means mounted on said inner portion of said auxiliary shaft and meshing with said drive and driven gears to interconnect said drive and driven shafts, gyroscopic means mounted on the outer portion of said auxiliary shaft, reaction means secured to said housing, said gyroscopic means and said reaction means connected to and cooperating with each other to resist rotation of said torque reaction cage to vary the relative speed between said drive shaft and said driven shaft.

2. A transmission comprising a housing, a drive shaft journaled in the housing, a driven shaft journaled in the housing, said shafts being substantially in axial alignment with each other, a torque reaction cage in said housing rotatively mounted on said shafts, a drive gear in said torque reaction cage and mounted on said drive shaft, a driven gear in said torque reaction cage and mounted on said driven shaft, an auxiliary shaft journaled in said torque reaction cage and having an outer portion externally of the cage and an inner portion internally of the cage, a first auxiliary gear meshing with said drive gear and mounted on the inner portion of said auxiliary shaft, a second auxiliary gear meshing with said driven gear and mounted on the inner portion of said auxiliary shaft, said first and second auxiliary gears interconnecting said drive and driven shafts, a gyroscopic yoke connected to the outer portion of said auxiliary shaft and having an axis of rotation axially in alignment with said auxiliary shaft, rotation of said torque reaction cage about said drive and driven shafts rotating said yoke with the axis of rotation of said yoke moving through an annular reference path, a gyroscopic mass having circumferential groove means, pivot connecting means on said yoke and fitting in said circumferential groove means, said groove means and said pivot connection means constituting an universal connection for rotating said gyroscopic mass about an axis universally tiltable with respect to said axis of rotation of said yoke, an annular cam member mounted on said housing, cam rider means connected to said gyroscopic mass in axial alignment with the axis of rotation thereof and riding against said annular cam member, said annular cam member and said cam rider means resisting tilting of said gyroscopic mass in a direction of said annular reference path, positionable means to position said annular cam member and said cam rider means riding thereon in a neutral alignment position with respect to said annular reference path and thereby positionably align the axis of rotation of said gyroscopic mass in straight alignment with said annular reference path, and means to shift said annular cam member and the cam rider means riding thereon out of said neutral alignment position and thereby positionably tilt the axis of rotation of said gyroscopic mass at a tiltable angle with respect to said annular reference path, rotation of said gyroscopic mass at said tiltable angle forcing said cam rider means against said annular cam member and producing a component of force on said gyroscopic yoke in a direction of annular reference path and tending to resist rotation of said torque reaction cage about said drive and driven shafts to control the relative speed between the drive and driven shafts.

3. A transmission comprising a housing, a drive shaft journaled in the housing, a driven shaft journaled in the housing, said shafts being substantially in axial alignment with each other, a torque reaction cage in said housing rotatively mounted on said shafts, a drive gear in said torque reaction cage and mounted on said drive shaft, a driven gear in said torque reaction cage and mounted on said driven shaft, an auxiliary shaft journaled in said torque reaction cage and having an outer portion externally of the cage and an inner portion internally of the cage, a first auxiliary gear meshing with said drive gear and mounted on the inner portion of said auxiliary shaft, a second auxiliary gear meshing with said driven gear and mounted on the inner portion of said auxiliary shaft, said first and second auxiliary gears interconnecting said drive and driven shafts, a gyroscopic yoke connected to the outer portion of said auxiliary shaft and having an axis of rotation axially in alignment with said auxiliary shaft, rotation of said torque reaction cage about said drive and driven shafts rotating said yoke with the axis of rotation of said yoke moving through an annular reference path, a gyroscopic universal connection means comprising groove and pivot means for universally connecting said gyroscopic mass to said yoke, said universal connection means rotating said gyroscopic mass about an axis universally tiltable with respect to said axis of rotation of said yoke, an annular cam member mounted on said housing, cam rider means connected to said gyroscopic mass in axial alignment with the axis of rotation thereof and riding against said annular cam member, said annular cam member and said cam rider means resisting tilting of said gyroscopic mass in a direction of said annular reference path, positionable means to position said annular cam member and said cam rider means riding thereon in a neutral alignment position with respect to said annular reference path and thereby positionably align the axis of rotation of said gyroscopic mass in straight alignment with said annular reference path, and means to shift said annular cam member and the cam rider means riding thereon out of said neutral alignment position and thereby positionably tilt the axis of rotation of said gyroscopic mass at a tiltable angle with respect to said annular reference path, rotation of said gyroscopic mass at said tiltable angle forcing said cam rider means against said annular cam member and producing a component of force on said gyroscopic yoke in a direction of annular reference path and tending to resist rotation of said torque reaction cage about said drive and driven shafts to control the relative speed between the drive and driven shafts.

4. A transmission comprising a housing, a drive shaft journaled in the housing, a driven shaft journaled in the housing, said shafts being substantially in axial alignment with each other, a torque reaction cage in said housing rotatively mounted on said shafts, a drive gear in said torque reaction cage and mounted on said drive shaft, a driven gear in said torque reaction cage and mounted on said driven shaft, an auxiliary shaft journaled in said torque reaction cage and having an outer portion externally of the cage and an inner portion internally of the cage, said auxiliary shaft having axis substantially perpendicular to the axes of said drive and driven shaft, auxiliary gear means meshing with said drive and driven gears and mounted on the inner portion of said auxiliary shaft for interconnecting said drive and driven shafts, a gyroscopic yoke connected to the outer portion of said auxiliary shaft and having an axis of rotation axially in alignment with said auxiliary shaft, rotation of said torque reaction cage about said drive and driven shafts rotating said yoke with the axis of rotation of said yoke moving through an annular reference plane substantially perpendicular to the axes of said drive and driven shafts, a gyroscopic mass, universal connection means comprising groove and pivot means for universally connecting said gyroscopic mass to said yoke, said universal connection means rotating said gyroscopic mass about an axis universally tiltable with respect to said axis of rotation of said yoke, an annular cam member, trunnion means for mounting said annular cam member to said housing, cam rider means connected to said gyroscopic mass in axial alignment with the axis of rotation thereof and riding against said annular cam member, said annular cam member and said cam rider means resisting tilting of said gyroscopic mass in a direction of said annular reference plane, positionable means to position said annular cam member and said cam rider means riding thereon in a neutral alignment position with respect to said annular reference plane, and thereby positionably align the axis of rotation of said gyroscopic mass in straight alignment with said annular reference plane, and means to shift said annular cam member and the cam rider means riding thereon out of said neutral alignment position and thereby positionably tilt the axis of rotation of said gyroscopic mass at a tiltable angle with respect to said annular reference plane, rotation of said gyroscopic mass at said tiltable angle forcing said cam rider means against said annular cam member and producing a component of force on said gyroscopic yoke in a direction of annular reference plane and tending to resist rotation of said torque reaction cage about said drive and driven shafts to control the relative speed between the drive and driven shafts.

5. A transmission comprising a housing, a drive shaft journaled in the housing, a driven shaft journaled in the housing, said shafts being substantially in axial alignment with each other, a torque reaction cage in said housing rotatively mounted on said shafts, a drive gear in said torque reaction cage and mounted on said drive shaft, a driven gear in said torque reaction cage and mounted on said driven shaft, an auxiliary shaft journaled in said torque reaction cage and having an outer portion externally of the cage and an inner portion internally of the cage, said auxiliary shaft having an axis substantially parallel to the axes of said drive and driven shafts, auxiliary gear means meshing with said drive and driven gears and mounted on the inner portion of said auxiliary shaft for interconnecting said drive and driven shafts, a gyroscopic yoke connected to the outer portion of said auxiliary shaft and having an axis of rotation axially in alignment with said auxiliary shaft, rotation of said torque reaction cage about said drive and driven shafts rotating said yoke with the axis of rotation of said yoke moving through an annular reference cylinder having an axis substantially parallel to the axes of said drive and driven shafts, a gyroscopic mass, universal connection means comprising groove and pivot means for universally connecting said gyroscopic mass to said yoke, said universal connection means rotating said gyroscopic mass about an axis universally tiltable with respect to said axis of rotation of said yoke, an annular cam member slidably mounted on said housing, cam rider means connected to said gyroscopic mass in axial alignment with the axis of rotation thereof and riding against said annular cam member, said annular cam member and said cam rider means resisting tilting of said gyroscopic mass in a direction of said annular reference cylinder, positionable means to position said annular cam member and said cam rider means riding thereon in a neutral alignment position with respect to said annular reference cylinder and thereby positionably align the axis of rotation of said gyroscopic mass in straight alignment with said annular reference cylinder, and means to shift said annular cam member and the cam rider means riding thereon out of said neutral alignment position and thereby positionably tilt the axis of rotation of said gyroscopic mass at a tiltable angle with respect to said annular reference cylinder, rotation of said gyroscopic mass at said tiltable angle forcing said cam rider means against said annular cam member and producing a component of force on said gyroscopic yoke in a direction of annular reference cylinder and tending to resist rotation of said torque reaction cage about said drive and driven shafts to control the relative speed between the drive and driven shafts.

6. A transmission comprising a housing, a drive shaft journaled in the housing, a driven shaft journaled in the housing, said shafts being substantially in axial alignment with each other, a torque reaction cage in said housing rotatably mounted on said shafts, a drive gear in said torque reaction cage and mounted on said drive shaft, a driven gear in said torque reaction cage and mounted on said driven shaft, an auxiliary shaft journaled in said torque reaction cage and having an outer portion externally of the cage and an inner portion internally of the cage, auxiliary gear means meshing with said drive and driven gears and mounted on the inner portion of said auxiliary shaft for interconnecting said drive and driven shafts, a gyroscopic yoke connected to the outer portion of said auxiliary shaft and having an axis of rotation axially in alignment with said auxiliary shaft, rotation of said torque reaction cage about said drive and driven shafts rotating said yoke with the axis of rotation of said yoke moving through an annular reference path, a gyroscopic mass, universal connection means comprising groove and pivot means for universally connecting said gyroscopic mass to said yoke, said universal connection means rotating said gyroscopic mass about an axis universally tiltable with respect to said axis of rotation of said yoke, an annular cam member mounted on said housing, cam rider means connected to said gyroscopic mass in axial alignment with the axis of rotation thereof and riding against said annular cam member, said annular cam member and said cam rider means resisting tilting of said gyroscopic mass in a direction of said annular reference path, positionable means to position said annular cam member and said cam rider means riding thereon in a neutral alignment position with respect to said annular reference path and thereby positionably align the axis of rotation of said gyroscopic mass in straight alignment with said annular reference path, and means to shift said annular cam member and the cam rider means riding thereon out of said neutral alignment position and thereby positionably tilt the axis of rotation of said gyroscopic mass at a tiltable angle with respect to said annular reference path, rotation of said gyroscopic mass at said tiltable angle forcing said cam rider means against said annular cam member and producing a component of force on said gyroscopic yoke in a direction of annular reference path, and tending to resist rotation of said torque reaction cage about said drive and driven shafts to control the relative speed between the drive and driven shafts.

7. A transmission comprising a housing, a drive shaft journaled in the housing, a driven shaft journaled in the housing, said shafts being substantially in axial alignment with each other, a torque reaction cage in said housing rotatively mounted on said shafts, a drive gear in said torque reaction cage and mounted on said drive shaft, a driven gear in said torque reaction cage and mounted on said driven shaft, a plurality of auxiliary shafts journaled in said torque reaction cage and having an outer portion externally of the cage and an inner portion internally of the cage, auxiliary gear means respectively meshing with said drive and driven gears and mounted on the inner portion of said auxiliary shafts for interconnecting said drive and driven shafts, a gyroscopic yoke respectively connected to the outer portion of said auxiliary shafts and each having an axis of rotation axially in alignment with the auxiliary shaft to which it is connected, rotation of said torque reaction cage about said drive and driven shafts rotating said yokes with the axis of rotation of said yokes moving through an annular reference path, a plurality of gyroscopic masses, universal connection means comprising groove and pivot means for universally connecting said gyroscopic masses to said yoke respectively, said universal connection means rotating said gyroscopic masses respectively about an axis universally tiltable with respect to said axis of rotation of said yoke, an annular cam member mounted on said housing, cam rider means connected to said gyroscopic masses in axial alignment with the axis of rotation thereof and riding against said annular cam member, said annular cam member and said cam rider means resisting tilting of said gyroscopic masses in a direction of said annular reference path, positionable means to position said annular cam member and said cam rider means riding thereon in a neutral alignment position with respect to said annular reference path and hereby positionably align the axis of rotation of said gyroscopic masses in straight alignment with said annular reference path, and means to shift said annular cam member and the cam rider means riding thereon out of said neutral alignment position and thereby positionably tilt the axis of rotation of said gyroscopic masses at a tiltable angle with respect to said annular reference path, rotation of said gyroscopic masses at said tiltable angle forcing said cam rider means against said annular cam member and producing a component of force on said gyroscopic yokes in a direction of annular reference path, and tending to resist rotation of said torque reaction cage about said drive and driven shafts to control the relative speed between the drive and driven shafts.

8. A variable speed transmission comprising a housing, a drive shaft journaled in the housing, a driven shaft journaled in the housing, said shafts being substantially in axial alignment with each other, a torque reaction cage in said housing rotatively mounted on said shaft, a drive means in said torque reaction cage and mounted on said drive shaft, a driven means in said torque reaction cage and mounted on said driven shaft, an auxiliary shaft journaled in said torque reaction cage and having an outer portion externally of the cage and an inner portion internally of the cage, auxiliary means mounted on said inner portion of said auxiliary shaft and connected in motion transmitting relationship with said drive and driven means to interconnect said drive and driven shafts, gyroscopic means mounted on the outer portion of said auxiliary shaft, and reaction means, said gyroscopic means and said reaction means connected to and cooperating with each other to resist rotation of said torque reaction cage to vary the relative speed between said drive shaft and said driven shaft.

9. A transmission including in combination a drive shaft, a driven shaft, gear means connected between said shafts and including gyroscopic means having an axis and driven by said drive shaft, cam reaction means, said gyroscopic means engageable with said cam reaction means to move the path of the axis of said gyroscopic means out of a plane substantially perpendicular to the drive shaft axis whereby the relative speed between said shafts is varied.

10. A transmission including in combination a drive shaft, a driven shaft, gear means connected between said shafts and including gyroscopic means having an axis, means for driving said gyroscope about its axis, means engageable with said gyroscopic means to move the path of the axis of said gyroscopic means out of a plane substantially perpendicular to the drive shaft axis thereby varying the relative speed between said shafts.

References Cited in the file of this patent

FOREIGN PATENTS

| | | |
|---|---|---|
| 774,746 | France | Mar. 11, 1935 |
| 918,516 | France | Oct. 28, 1946 |